(12) United States Patent
Iraschko

(10) Patent No.: US 7,789,205 B2
(45) Date of Patent: Sep. 7, 2010

(54) LINKAGE POSITIONER FOR A DRUM BRAKE

(75) Inventor: Johann Iraschko, Schweitenkirchen (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 292 days.

(21) Appl. No.: 11/942,377

(22) Filed: Nov. 19, 2007

(65) Prior Publication Data

US 2008/0128225 A1  Jun. 5, 2008

Related U.S. Application Data

(63) Continuation of application No. PCT/EP2006/004306, filed on May 9, 2006.

(30) Foreign Application Priority Data

May 20, 2005 (DE) .................. 10 2005 023 408
Aug. 31, 2005 (DE) .................. 10 2005 041 343

(51) Int. Cl.
*F16D 65/56* (2006.01)
(52) U.S. Cl. .............................. 188/79.55; 188/196 BA
(58) Field of Classification Search ... 188/79.53–79.58, 188/196 B, 196 BA, 196 D, 196 R, 196 V
See application file for complete search history.

(56) References Cited

U.S. PATENT DOCUMENTS

| 4,875,557 | A | * | 10/1989 | Hagin et al. | 188/79.55 |
| 5,207,299 | A | * | 5/1993 | Feldmann | 188/79.55 |
| 5,222,579 | A | * | 6/1993 | Frania | 188/79.55 |
| 5,350,043 | A | * | 9/1994 | Crewson et al. | 188/79.55 |
| 2004/0026193 | A1 | * | 2/2004 | Philpott | 188/196 V |
| 2008/0128226 | A1 | * | 6/2008 | Iraschko | 188/79.55 |

FOREIGN PATENT DOCUMENTS

| DE | 195 28 642 A1 | 2/1997 |
| EP | 0 598 290 A1 | 5/1994 |
| EP | 0 614 025 B1 | 9/1994 |
| GB | 2 304 388 A | 3/1997 |

OTHER PUBLICATIONS

International Preliminary Report on Patentability and Form PCT/ISA/237 with English translation of relevant portions (twelve (12) pages).

* cited by examiner

*Primary Examiner*—Christopher P Schwartz
(74) *Attorney, Agent, or Firm*—Crowell & Moring LLP

(57) ABSTRACT

A linkage positioner for a drum brake for adjusting braking-related wear, especially on brake linings, has an overload clutch and a one-directionally rotating or one-way clutch, including a ball ramp clutch, which is biased with the aid of a pressure spring, and a bevel clutch.

20 Claims, 5 Drawing Sheets

Section A-B-C-D

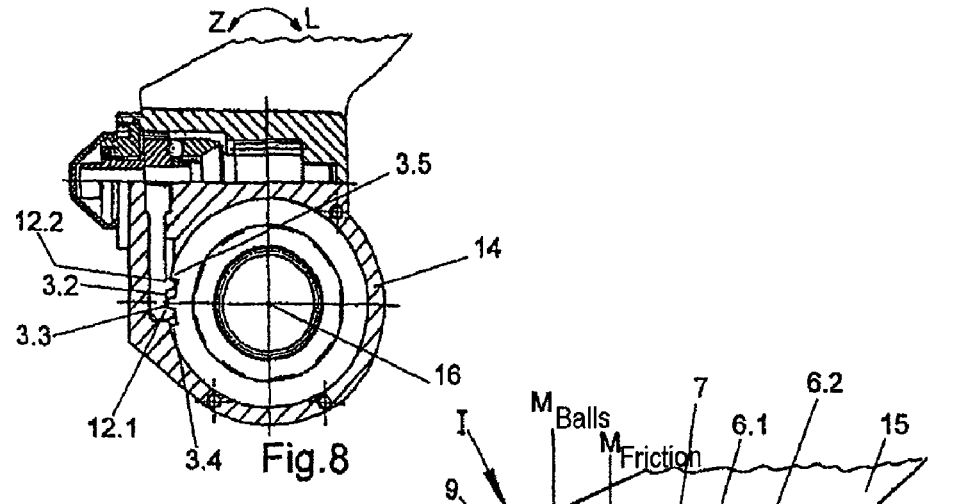
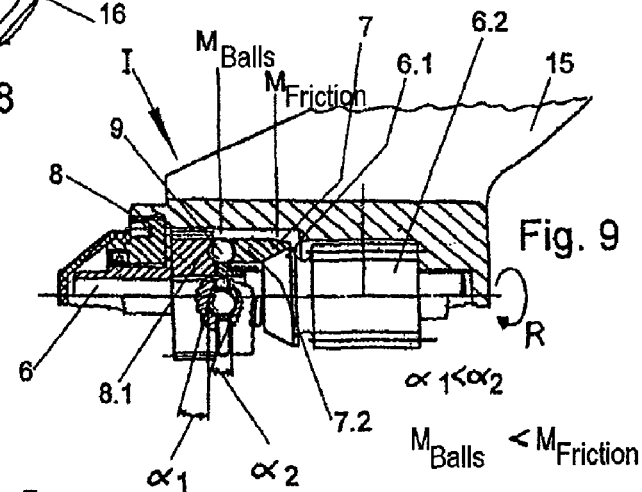
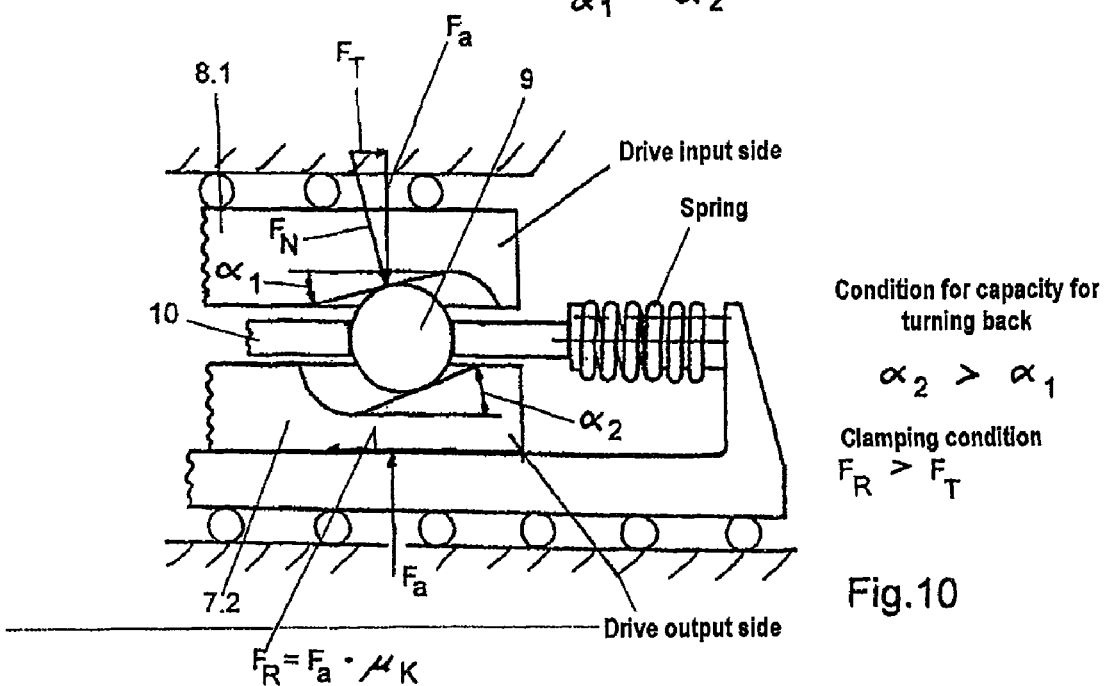

LINKAGE POSITIONER FOR A DRUM BRAKE

This application is a continuation of international application PCT/EP2006/004306, filed May 9, 2006, the entire disclosure of which is incorporated herein by reference and which, in turn, claims priority of prior German applications 10 2005 023 408.9, filed May 20, 2005, and 10 2005 041 343.9, filed Aug. 31, 2005.

Cross-reference is also made to parallel international application PCT/EP2006/004303, as well as to the U.S. national phase application based on that parallel international application.

BACKGROUND AND SUMMARY OF THE INVENTION

This invention relates to a linkage adjuster for a drum brake for adjusting the braking-induced wear at friction linings having an overload clutch and a one-way rotational clutch or directional clutch.

In heavy utility vehicles, pneumatically actuated drum brakes are often used as friction brakes. A preferred type of construction is the so-called S-cam drum brake.

In order to generate a braking force, the brake pads of the drum brake, which form or support the brake linings, must be pressed in the radial direction from the inside against the drum of the drum brake. In the S-cam drum brake, this takes place by rotating a brake shaft, which has, at one end, a double involute in an S-shape. The two brake pads are supported with their ends on the cam, with the ends that are situated opposite these ends being fastened, for example, to a brake carrier so as to be pivotable about a bolt. For braking, the brake shaft with the S-cam must be rotated until the brake pads come into contact against the drum with the desired force. This rotation of the brake shaft takes place by way of a compressed-air-actuated brake cylinder, which, with its piston, generates a torque by way of a lever and transmits that torque to the brake shaft.

Since the brake pads or the brake linings become worn during braking, it is necessary to compensate for the brake lining wear with an alignment device. For this purpose, the brake shaft with the S-cam must be rotated by a corresponding magnitude in the direction in which the brake linings are adjusted towards the drum during the braking process, in order to move the brake pads closer to the inside of the drum. This direction is referred to as the application direction. However, in the rest position, a small gap must remain in order to ensure an efficient release behavior. Re-alignment can be carried out at regular intervals, and also manually. For this purpose, re-alignment must be carried out at the brake lever of the brake shaft on which the brake cylinder engages with its piston rod. Since manual adjustment is carried out neither according to requirements nor continuously, so-called automatic linkage adjusters are standard equipment on vehicles with S-cam drum brakes.

There are various linkage adjuster systems. A first classification can be made according to the adjusting principle. According to one adjusting principle, adjustment takes place at the start of the braking process, while, according to the other adjusting principle, adjustment is carried out at the end of the braking process, or during the release process.

Further differences relate to the type of alignment of the control disk. In order to permit the adjustment function, the control disk must be so rotationally fixedly connected to an axle part that a relative rotational or pivoting movement can take place between the control disk and the linkage adjuster. Here, it is to be ensured that, during installation of the linkage adjuster, the control disk is aligned within a previously defined working range.

In order to avoid faults, linkage adjusters have therefore also been developed with so-called self-alignment. Here, the control disk must be connected only to the axle, and alignment is no longer necessary.

A linkage adjuster with a basic design is composed substantially of a worm gear, a worm, an overload or load shift clutch, a preload spring, a one-way clutch (usually operating on the wrap spring principle), and, in the case of manual alignment, a gearwheel, a toothed rack, and a so-called control disk with a notch, or in the case of automatic adjustment, a further worm gear, a drive input worm with a gearwheel, and a control disk with an outer toothing.

The mechanism is situated in a housing having a lever to which the brake cylinder is articulatedly connected. The brake shaft is coupled by way of a spline toothing to the worm gear. The control disk, which is rotatable relative to the linkage adjuster, is connected, as mentioned above, to the axle.

Reference is made as an illustrative example to European document EP 0 614 025 B1. This document describes an adjusting device for a disk brake, with both of the above-stated functional principles being used together by way of adjustment carried out at the start of the braking process and tensioning an elastic element. The elastic element is relaxed during the release process and brings about a further adjustment.

Linkage adjusters that are presently on the market do not always meet the expectations or demands with regard to durability and permanent functionality. A one-way clutch in the form of a wrap spring has been proven to be a component which is susceptible to wear. The function of this component is highly dependent on the friction conditions, on the shaping, and on the dimensional stability of the mating faces. If wear and/or changes to the friction conditions occur over the course of time, failure of the component, and therefore of the entire linkage adjuster, can occur.

In addition, the mechanical expenditure for linkage adjusters (in particular with self-alignment) is relatively high, since a plurality of individual parts of precision design are required for construction of those adjusters.

An object of the present invention is to create a linkage adjuster of the above-specified type with a mechanism that has a high level of robustness and a simple construction, with the linkage adjuster additionally being provided with self-alignment. A further object is to provide the most cost-effective production possible.

According to the invention, therefore, a linkage adjuster for a drum brake for adjusting braking-induced wear at friction linings includes an overload clutch and a one-way rotational clutch or directional clutch. At least one of the overload and one-way rotational or directional clutches includes at least one of a ball ramp clutch, which is preloaded by a spring, and a cone clutch.

With a linkage adjuster according to the present invention, it is possible for the above-described difficulties or disadvantages to be avoided, since the linkage adjuster has a low number of individual parts, construction takes place with simple-to-produce individual parts, and the individual parts have a high level of wear resistance.

A linkage adjuster according to the invention, for a drum brake adjusting for braking-induced wear at friction linings, has an overload clutch and a one-way rotational clutch or directional clutch, and includes a ball ramp clutch, which is preloaded by a pressure spring, and a cone clutch.

In another embodiment, the linkage adjuster has a construction with two modules. One module has the ball ramp clutch and the cone clutch, and the other module preferably performs the directional clutch function.

In a further preferred embodiment, the linkage adjuster has two modules, with one module having the overload clutch and the other module having the ball ramp clutch and the cone clutch with directional clutch, manual restoring, and force transmission functions. An advantageous functional distribution is therefore possible, with the two modules arranged in a simple construction with a low susceptibility to faults.

Preferably, the ball ramp clutch is composed of oppositely arranged end faces, each of which is formed with a ball ramp contour for clamping balls arranged in between. Here, it is particularly advantageous for the components to be mounted by ball bearings, since a high level of efficiency is permitted in this way.

By way of simple production, the ball ramp contours of the end faces of the ball ramp clutch have different gradient angles. This is particularly advantageous if the first gradient angle of the ball ramp contour, which forms the drive input side during adjustment, is smaller than the second gradient angle of the ball ramp contour, which forms the drive output side during adjustment, since a directional clutch is permitted in this way.

In an alternative embodiment, the ramp contours have curved formations with different radii of curvature.

The balls provided between the ramp contours are arranged in a ball cage that is preloaded by the pressure spring in such a way that the balls, during adjustment, bear against the ball ramps for force transmission. It is preferable for the spring or pressure spring to be embodied as a friction spring. This results in a precise functional behavior on account of the use of precise and friction-independent components.

In one preferred embodiment, the overload clutch of one module is formed by a control disk, which is connected in a frictionally engaging manner to a stationary locking ring. Here, it is advantageous for the control disk to be arranged between two friction disks, which are preloaded by a plate spring. The load of the plate spring can be easily defined in advance by its construction. In addition, the required parts are few in number, simple to produce, and easy to assemble.

A drum brake according to the invention has a linkage adjuster according to the invention.

Further advantages, details and features of the invention can be gathered from the following detailed description in connection with the appended drawings.

The invention is explained in more detail below on the basis of the exemplary embodiment illustrated in the drawing figures.

BRIEF DESCRIPTION OF THE DRAWINGS

FIG. 1a shows a cross section through the linkage adjuster of FIG. 1;

FIG. 1b shows a cross section through the linkage adjuster of FIG. 1 along the line E-F;

FIG. 1c shows an enlarged illustration of the marked detail of the linkage adjuster of FIG. 1a;

FIG. 8 shows the linkage adjuster of FIG. 1 in a rest position;

FIG. 9 shows the linkage adjuster of FIG. 1 in an enlarged partial section illustration of its upper section;

FIG. 10 is a schematic illustration of a ball ramp clutch;

DETAILED DESCRIPTION OF THE INTENTION

The same reference symbols in the individual figures denote identical or functionally equivalent parts.

Figure 1:
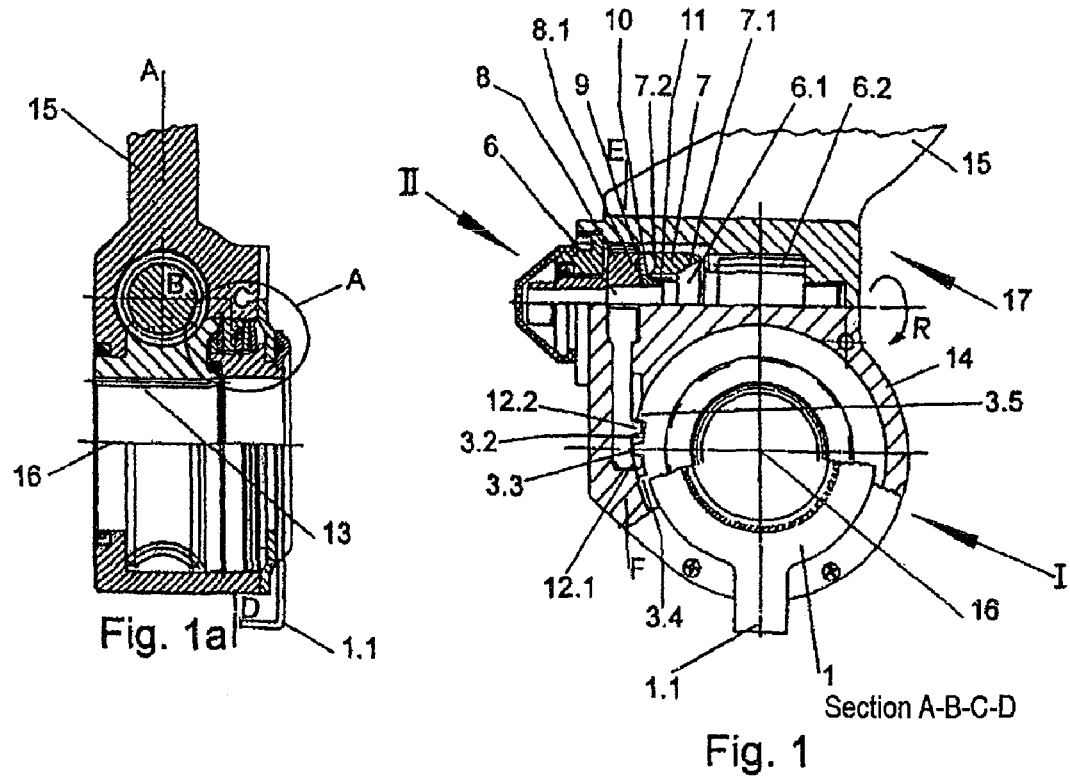
FIG. 1 shows an exemplary embodiment of a linkage adjuster according to the invention, with an axle of the linkage adjuster being shown in longitudinal section.

FIG. 1 shows an exemplary embodiment of a linkage adjuster 17 according to the invention in different section illustrations, with an axle 6 of the linkage adjuster 17 being shown in longitudinal section.

The adjustment mechanism of this embodiment of the linkage adjuster 17 is composed substantially of two functional groups. A first module, module I, has the functions of self-alignment and overload protection. Module I is composed of the following individual parts: a locking ring 1 with an integrally formed locking arm 1.1; a bush 2 with an outer profile 2.1; a control disk 3 with an axial inner profiling 3.1 and notches 3.2 on the periphery; two plate springs 4; and two friction disks 5.

A further module, module II, has the functions of a directional clutch (freewheel), manual restoring, and force transmission. Module II is composed of the following individual parts: an axle 6 with an outer cone 6.1 and worm 6.2; a clamping bush 7 with an inner cone 7.1 and an end-side ball ramp contour 7.2; a gearwheel 8 with an end-side ramp contour 8.2; a plurality of clamping balls 9; a ball cage 10 with a friction spring 11; a toothed rack 12; and a worm gear 13 with an inner profiling.

The ball ramp contour 7.2, the ramp contour 8.1, and the clamping balls 9 form a ball ramp clutch 7.2, 8.1, 9, and the outer cone 6.1 and the inner cone 7.1 form a cone clutch 6.1, 7.1. The ball ramp clutch 7.2, 8.1, 9 and the cone clutch 6.1, 7.1 are coordinated with one another in such a way that, in one rotational direction about the longitudinal axis of the axle 6, that is to say in the application direction R, self-locking, and therefore a blocking action, of the ball ramp clutch is provided, and in the release direction, that is to say the rotational direction opposite to the application direction R, a freewheel action is provided. This means that, for the latter case, a first torque $M_{Balls}$ of the ball ramp clutch is smaller than a second torque $M_{Friction}$ of the cone clutch.

The linkage adjuster 17 is arranged in a housing 14, with a brake shaft axis 16 of the worm gear 13 standing perpendicular on the plane of the drawing and the longitudinal axis of the axle 6 of the linkage adjuster 17 running at right angles brake shaft axis 16. In this example, a lever 15 is arranged on the housing 14 above the axle 6, which lever 15 is operatively connected to a brake cylinder (not illustrated).

Situated within the worm gear 13 is a brake shaft (likewise not illustrated) which, at its end, which is not shown here, has an S-cam formation which, in a known way, actuates the brake pads of a drum brake. The brake shaft runs in the direction of the brake shaft axis 16 and is rotationally fixedly connected to the worm gear 13. By actuating the lever 16 in the direction Z, which is illustrated by arrows, the brake linings are pushed apart, and in the direction L, a release of the brake linings takes place in a known way. The direction Z is referred to as the application direction and the direction L is referred to as the release direction.

A functional description of an automatic adjustment function will now take place with reference to FIGS. 1 to 8.

Figure 3:
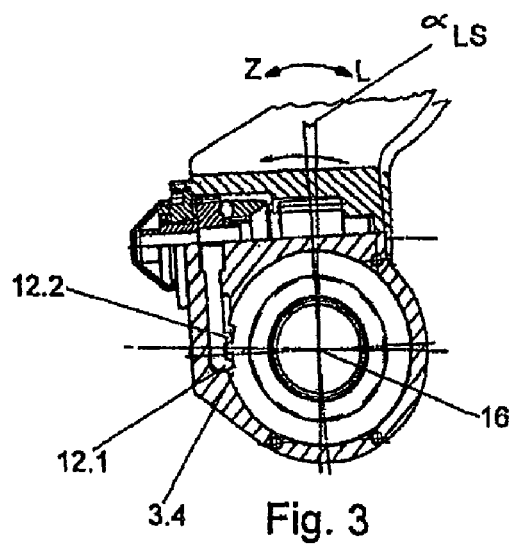
FIG. 3 shows the linkage adjuster of FIG. 1 in a second applied position.

The adjustment takes place at the start of a braking process. If a pressure is introduced into the associated brake cylinder, then the piston rod of the brake cylinder is deployed and, via the lever 15, actuates the housing 14, with a pivoting movement taking place about the brake shaft axis 16 in the application direction Z by a first angle $\alpha_{LS}$ (FIG. 3). The force transmission required for this purpose runs from the lever 15 via the upper section of the housing 14, the axle 6, and the worm 6.2 to the worm gear 13 which is rotationally fixedly connected to the brake shaft, as is explained above and as can be seen from FIG. 1a.

The toothed rack 12 is operatively connected to the axle 6 of the linkage adjuster 17 by means of the gearwheel 8, with the toothed rack 12 being arranged in a movable fashion. At its lower end, the toothed rack 12 has a first cam 12.1 and a second cam 12.2 which are arranged with a spacing. The cams 12.1 and 12.2 are in each case in engagement with notches that are separated by a tooth 3.3 and are arranged on a section of the periphery of a control disk 3. Below, only one notch 3.2 is considered. The control disk 3 is fastened in a frictionally engaging manner by way of a locking ring 1 to a locking arm 1.1 in such a way that the control disk 3 is stationary relative to the pivoting movement of the housing 14. FIG. 1c shows an enlarged illustration of the marked region in FIG. 1a. In this example, the control disk 3 is held in a frictionally engaging manner between two friction disks 5, which are preloaded by a plate spring 4. The magnitude of a holding torque can be defined in advance by the load of the plate spring 4 and the friction properties of the friction pairing of friction disks 5 and control disk 3.

Figure 2:
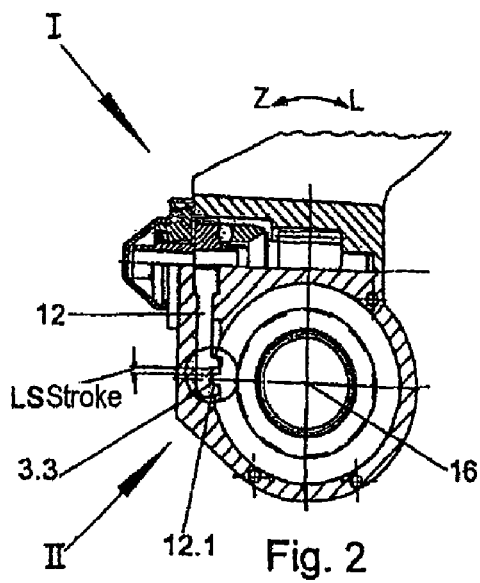
FIG. 2 shows the linkage adjuster of FIG. 1 in an initial position.

In the first phase of the course of the movement, a so-called idle travel between the second cam 12.2 of the toothed rack 12 and the notch 3.2 in the stationary control disk 3 is overcome. The magnitude of this idle travel determines the air play LS Stroke between the brake pads and brake drum (FIG. 2).

In the next phase, the cams 12.1, 12.2 of the toothed rack 12 come into contact against a shoulder 3.4, 3.5 of the control disk 3 (FIG. 3). There are now two possible operating states here.

Figure 4:
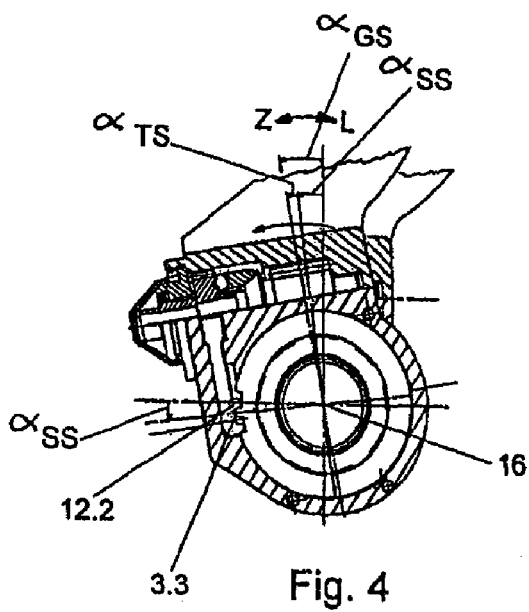
FIG. 4 shows the linkage adjuster of FIG. 1 in a first applied position.

Case 1: If the air play LS or LS Stroke is correct (FIG. 2), then the brake pads come into contact against the drum inner wall at the same time as the contact of the cam 12.2 of the toothed rack 12. An adjustment is now no longer possible on account of the high forces, but on account of the elasticities in the components of the drum brake, a further rotation by a third angle $\alpha_{ss}$ at the linkage adjuster 17 is carried out about the brake shaft axis 16. Since the gearwheel 8 can now no longer be rotated on account of the high forces, a movement of the toothed rack 12 is also no longer possible. However, since the toothed rack 12 is coupled to the control disk 3 and the control disk 3 is rotationally fixedly locked to the axle, the overload protection function of module I must now take place. Above a force threshold, which is determined by the plate springs 4 and the friction disks 5, a relative movement between the control disk 3 and friction disks 5 takes place. A movement of the linkage adjuster 17 by a travel $S_{2S}$ (FIG. 5) is therefore possible without damage despite a blocked adjusting mechanism (FIG. 4). A second angle $\alpha_{GS}$ is therefore obtained as a total rotational angle.

Figure 5:
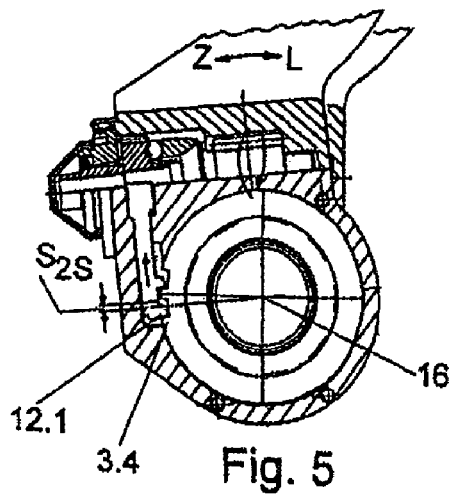
FIG. 5 shows the linkage adjuster of FIG. 1 in a third applied position.

Case 2: If the air play between the brake pads and brake drum is too great, a rotational movement is introduced into the gearwheel 8 by the toothed rack 12. The movement is transmitted by the ball ramp clutch 7.2, 8.1, 9 and the cone clutch 6.1, 7.1 to the worm 6.2, the worm gear 13, and, finally, to the brake shaft. The play between the brake pads and brake drum is therefore reduced (FIG. 5). When, in the further course, the brake pads come into contact against the brake drum, the function process is as described under case 1.

Figure 6:
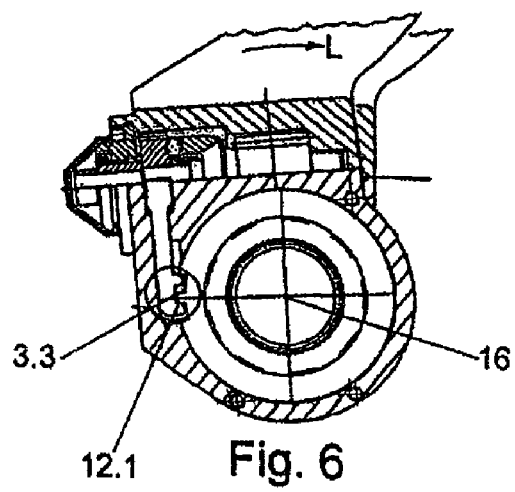
FIG. 6 shows the linkage adjuster of FIG. 1 in a first release position.
Figure 7:
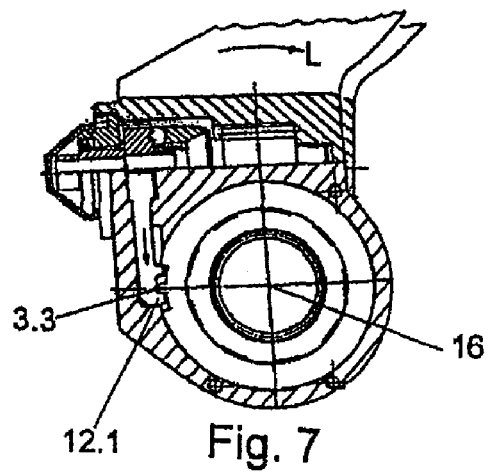
FIG. 7 shows the linkage adjuster of FIG. 1 in a second release position.

During the release of the brake, the linkage adjuster 17 is placed back into the initial position by the restoring forces. Here, the cams 12.1, 12.2 of the toothed rack 12 initially move onto the other side of the abutment shoulder in the notches in the control disk 3, and the toothed rack 12 is subsequently pushed into the initial position, and finally, the control disk 3 is placed back into the original position (FIGS. 6, 7, 8).

Manual Adjustment of the Linkage Adjuster 17

When changing the brake linings, it is necessary to turn the linkage adjuster 17 back manually into the initial position. Here, the worm 6.2 must be rotated counter to the blocking action of the freewheel, that is to say counter to the blocking action of the ball ramp clutch 7.2, 8.1, 9. In order to permit this, the clamping balls 9 are guided by means of a ball cage 10, as shown in FIG. 1. The ball cage 10 is in this exemplary embodiment connected in a frictionally engaging manner by a so-called friction spring 11 to the axle 6, which is used as a turning-back axle. Since, when turning back manually, the force introduction into the blocking clutch takes place from the other side, that is to say from the cone clutch 6.1, 7.1, it is possible, by way of the action of the friction spring 11 and the special design of the ball ramp geometry, to disengage the blocking action. The linkage adjuster 17 can therefore be turned back with relatively little force.

FIGS. 9 and 10 are now considered in this regard. The ball ramps 7.2, 8.1 have a first gradient angle $\alpha_1$ and a second gradient angle $\alpha_2$. In this example, the first gradient angle $\alpha_1$ is smaller than the second gradient angle $\alpha_2$, with the first gradient angle $\alpha_1$ being the gradient angle of the ramp contour 8.1 of the gearwheel 8 which is driven by the toothed rack 12 during the adjustment process. The second gradient angle $\alpha_2$ is the gradient angle of the ball ramp contour 7.2 of the drive-output-side cone clutch, specifically of the inner cone 7.1. FIG. 10 illustrates this ratio schematically in an enlarged fashion. If, as is the case when turning back manually, the ball cage 10 with the clamping balls 9 is now turned back, the spacing of the ball raceways between the two clutch halves 7.2, 8.1 is enlarged, with a blocking action being deactivated or prevented. The balls 9 pass into the left-hand depression, which can be seen in FIG. 10. Here, as a result of the enlarging spacing of the ball ramp contours 7.2, 8.1, the pressing force of the cone clutch 6.1, 7.1 is reduced, which permits the rotation of the axle 6. If, in contrast, the force introduction takes place from the drive-input-side clutch half, in this case the ramp contour 8.1 of the gearwheel 8, then the clamping balls 9 are forced against the ball ramps by way of the ball cage 10, which is impeded by the friction spring 11, and a clamping action is thereby generated. Here, the cone sections of the cone clutch 6.1, 7.1 are pressed together, so that their frictionally engaging action increases.

For a clamping condition of the ball ramp clutch, according to FIG. 10, the friction force $F_R$ is greater than the tangential force $F_T$, with the tangential force $F_T$ constituting a first torque $M_{Balls}$ of the ball ramp clutch and the friction force $F_R$ constituting a second torque $M_{Friction}$ of the cone clutch. From these parameters, the condition for the capacity for turning back can be determined, specifically that $\alpha_1$ must be smaller than $\alpha_2$, from the known ratios which are not to be explained in any more detail, the friction forces illustrated in FIG. 10.

Automatic Alignment when Installing the Linkage Adjuster 17

Figure 11:
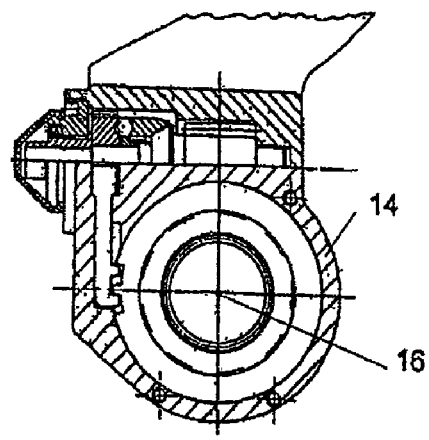
FIG. 11 shows the linkage adjuster of FIG. 1 in a working position.

As a result of the frictional connection of control disk 3 and locking ring 1, it is possible for the locking arm 1.1 of the locking ring 1 to be fixed in any desired position. The toothed rack 12 which is coupled to the control disk 3 is moved here within the predetermined working travel, as explained above. If, for example, the control disk 3 is rotated to the left, counterclockwise, when installing the linkage adjuster 17 (FIG. 11), so that the toothed rack 12 reaches the lower stop, the provided working position is already present, and a further alignment is not necessary.

Figure 12:
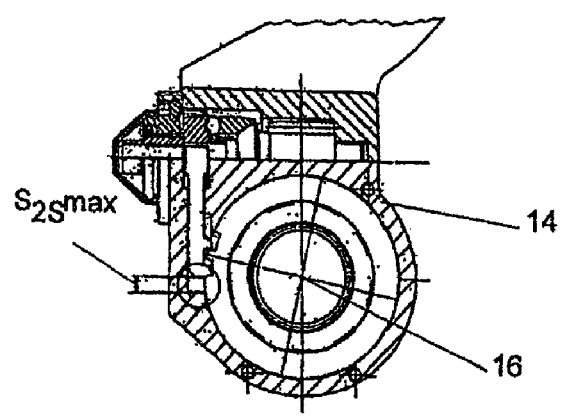
FIG. 12 shows the linkage adjuster of FIG. 1 in a position with a rotated control disk.
Figure 13:
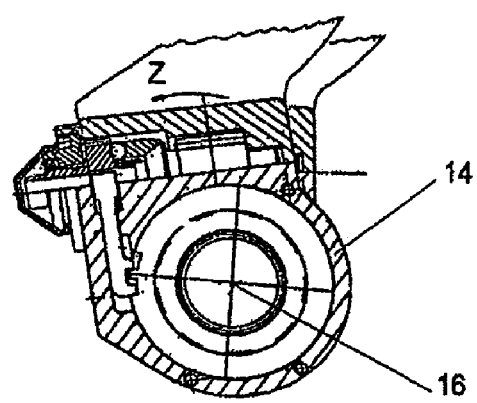
FIG. 13 shows the linkage adjuster of FIG. 1 in an applied position with self-alignment of the control disk.
Figure 14:
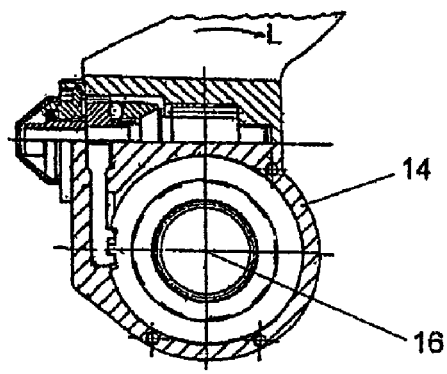
FIG. 14 shows the linkage adjuster of FIG. 1 with an aligned control disk.

If the control disk 3 is rotated to the right, clockwise, the toothed rack 12 is moved in the extreme case to an upper stop, as shown in FIG. 12. If the first brake actuation now takes place, the control disk 3 is rotated to the left, counter to the friction force of the friction disks 5. When the brake is released, the control disk 3 remains in the previously-reached position, since the toothed rack 12, on account of its coupling to the module I and the associated freewheel function, cannot exert a restoring force. The intended working position is therefore reached, as can be seen from FIGS. 12, 13, and 14.

In this way, a linkage adjuster 17 is created with the following advantageous features:

1) Cost-effective production of most of the individual parts, substantially by means of non-cutting shaping.

2) Simple construction and therefore low susceptibility to failure.

3) High level of robustness by avoiding filigree components.

4) Avoidance of incorrect assembly as a result of the self-alignment.

5) Constant functional behavior during the entire service life on account of the constructive design with wear-resistant functional units.

6) Manual adjustment with little force expenditure. Here, the clamping bush 7 can also be fixed, or a pin can be attached to the clamping bush 7 for clamping.

The above-described embodiments are merely exemplary and do not restrict the invention. Variations and modifications are obvious and possible to a person skilled in the art.

It is thus for example possible for the toothed rack 9 to also have a second cam and for the control disk to have a second notch. Further cams and notches are likewise possible.

It is conceivable for the ramp contours to have more than two different gradient angles. Curved raceways are of course also possible.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A linkage adjuster for a drum brake for adjusting braking-induced wear at friction linings, comprising:
   an overload clutch, and
   a one-way rotational clutch or directional clutch,
   wherein at least one of the overload and one-way rotational or directional clutches includes a cone clutch and a ball ramp clutch, which ball ramp clutch is preloaded by a spring.

2. The linkage adjuster as claimed in claim 1, wherein the adjuster is constructed with two modules, with one of the two modules having the ball ramp clutch and the cone clutch, and with the other of the two modules functioning as the directional clutch.

3. The linkage adjuster as claimed in claim 2, wherein the ball ramp clutch is composed of oppositely arranged end faces, each formed with a ball ramp contour for clamping balls that are arranged between the faces.

4. The linkage adjuster as claimed in claim 3, wherein the ball ramp contours have different gradient angles.

5. The linkage adjuster as claimed in claim 4, wherein a first gradient angle of one of the ball ramp contours that forms a drive input side during adjustment is smaller than a second gradient angle of another of the ball ramp contours that forms a drive output side during adjustment.

6. The linkage adjuster as claimed in claim 3, wherein the ramp contours have curved formations with different radii of curvature.

7. The linkage adjuster as claimed in claim 3, wherein the clamping balls are arranged in a ball cage that is preloaded by the spring in such a way that the clamping balls, during adjustment, bear against the ball ramp contours for force transmission.

8. The linkage adjuster as claimed in claim 1, wherein the adjuster is constructed with two modules, with one of the two modules having the overload clutch, and with the other of the two modules having the ball ramp clutch and the cone clutch functioning as the directional clutch, providing manual restoring and force transmission.

9. The linkage adjuster as claimed in claim 8, wherein the overload clutch is formed by a control disk connected in a frictionally engaging manner to a stationary locking ring.

10. The linkage adjuster as claimed in claim 9, wherein the control disk is arranged between two friction disks that are preloaded by a plate spring.

11. The linkage adjuster as claimed in claim 8, wherein the ball ramp clutch is composed of oppositely arranged end faces, each formed with a ball ramp contour for clamping balls that are arranged between the faces.

12. The linkage adjuster as claimed in claim 1, wherein the ball ramp clutch is composed of oppositely arranged end faces, each formed with a ball ramp contour for clamping balls that are arranged between the faces.

13. The linkage adjuster as claimed in claim 12, wherein the ball ramp contours have different gradient angles.

14. The linkage adjuster as claimed in claim 13, wherein a first gradient angle of one of the ball ramp contours that forms a drive input side during adjustment is smaller than a second gradient angle of another of the ball ramp contours that forms a drive output side during adjustment.

15. The linkage adjuster as claimed in claim 13, wherein the ramp contours have curved formations with different radii of curvature.

16. The linkage adjuster as claimed in claim 12, wherein the ramp contours have curved formations with different radii of curvature.

17. The linkage adjuster as claimed in claim 12, wherein the clamping balls are arranged in a ball cage that is preloaded by the spring in such a way that the clamping balls, during adjustment, bear against the ball ramp contours for force transmission.

18. A drum brake having a linkage adjuster as claimed in claim 1.

19. The linkage adjuster as claimed in claim 1, wherein the spring is a pressure spring.

20. The linkage adjuster as claimed in claim 1, wherein the spring is a friction spring.

* * * * *